Patented May 17, 1932

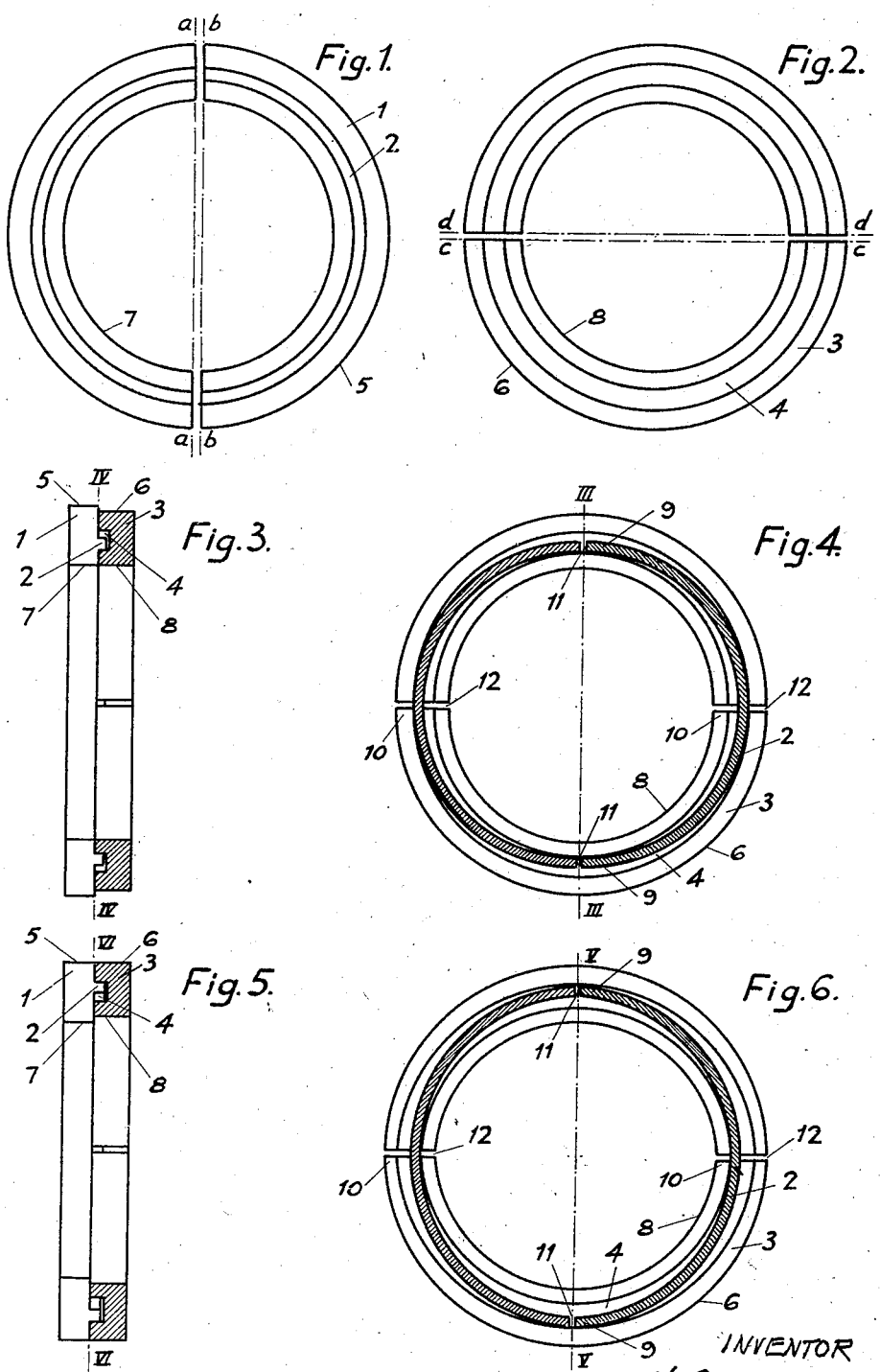

1,859,211

UNITED STATES PATENT OFFICE

TAGE MADSEN, OF GOTTENBORG, SWEDEN

PACKING RING

Application filed February 6, 1929, Serial No. 337,948, and in Great Britain February 14, 1928.

This invention relates to split packing rings and particularly to composite packing rings which are composed of two or more complete split rings interengaged by means of flanges and recesses.

The object of this invention is to provide an improved practical arrangement of such composite rings which will make it possible to simplify the mounting of such rings on a piston, stuffing box or other member and their removal therefrom.

In the accompanying drawings which illustrate one embodiment of the invention:

Fig. 1 is a plan view of one of the rings,

Fig. 2 a plan view of the other ring in the set,

Fig. 3 a cross sectional view of the composite ring for stuffing boxes, the section being taken along line III—III in Fig. 4.

Fig. 4 a radial section of the same ring along the line IV—IV in Fig. 3, and Figs. 5 and 6 similar views to Figs. 3 and 4 showing a composite ring for use on pistons, Fig. 5 being a section along line V—V in Fig. 6, and Fig. 6 being a section along line VI—VI in Fig. 5.

In the drawings Fig. 1 shows a continuous ring 1 turned and provided with an axially projecting flange 2. After having been turned on the surface which is to co-act with the corresponding surface of the other ring in the set, the ring 1 is divided in segments and partly cut away along the lines $a$—$a$ and $b$—$b$. Each of the halves is then so treated, as, for instance, by hammering or rolling, that the ring tends to bend inwardly. The ring thereby loses its circular shape and attains a more or less oval form with the ends closer together than in Fig. 1. Similarly the continuous ring 3 in Fig. 2 is turned and provided with a groove or recess 4. Then it is cut along the lines $c$—$c$ and $d$—$d$ and given a tendency to spring together with its ends closer to each other than in Fig. 2. At this stage of the process the half rings illustrated in Fig. 1 are placed upon the halfrings shown in Fig. 2 in such a manner that the lines $a$—$a$, $b$—$b$, lie perpendicular to the lines $c$, $d$, or substantially so and so that the flange 2 engages the recess 4. As the width of the flange 2 is smaller than the width of the recess 4, the ring halves, when assembled, will occupy such positions that neither the outer surfaces 5 and 6 of the rings 1 and 3 nor their inner surfaces 7 and 8 will register. It therefore becomes necessary to turn the inner surfaces 7 and 8 to exact cylindrical form. Fig. 3 shows a section of the composite ring at this stage of manufacture, that is to say, in the state in which the two cylindrical surfaces 7 and 8 coincide, while the outer surfaces 5 and 6 do not. If desired, for any reason, these outer surfaces 5 and 6 may be turned also.

In Fig. 4 the two ends 9 of each flange 2 tend to exert inward pressure, thereby pressing the halves of the ring 3 together by making contact with the inner surface of the recess 4. Similarly the two ends 10 of each recess 4 tend to press inwardly against the flange 2 thereby forcing the halves of the ring 1 together. Thus the four half rings are kept together. If the diameter of the cylindrical surface 7, 8 is equal to the diameter of the piston rod to be packed, and a space is left at 11 and 12 between the adjacent ends of the halves of the rings 1 and 3, respectively, the composite ring will be kept in close contact with the piston rod and will maintain its packing properties even after some wear has taken place.

In the case of a fire check ring designed according to this invention the ends of the half rings must be kept in close contact, that is to say, no space must be left at 11 or 12.

When applying this invention to piston rings the springing tendency of the rings 1 and 2 should be reversed; in other words, the ends of each half ring should tend to spring outwards instead of inwards. In other respects the process of manufacture will be the same as that above described excepting that the composite ring must be turned on its outer surface 5, 6. The inner surfaces 7 and 8, may, of course, also be turned if desired.

By the use of packing rings composed of four segments, as hereinbefore described, the trouble involved in replacing worn rings is reduced to a minimum, because a smaller number of parts of the motor (or other machine to which the packing is applied) have to be removed during dismantling and subsequently reassembled. As the joints of one ring are spaced apart 90° in relation to the joints of the other ring in the set a good fluid-tight fit is ensured.

It is not necessary for the flange and the recess to be continuous; they may be interrupted, in which case the remaining parts are capable of exerting sufficient pressure upon the opposite ring to fulfil the purpose in view.

In order to maintain the segments in proper relative position they may be provided with pins, in the known manner.

I claim:—

1. A packing ring comprising two rings of equal diameter and width interengaged by means of axially disposed annular flanges and recesses, the recesses being wider than the flanges and each ring divided in segments, the joints of one ring being spaced apart from the joints of the other ring and the ends of one segment radially pressing the adjacent segments of the other ring.

2. A packing ring comprising two rings of equal diameter and width interengaged by means of axially disposed annular flanges and recesses, the said recesses being wider than the flanges, each ring being divided into two equal segments, the joints of one ring being spaced apart from the joints of the other ring and the ends of one segment radially pressing the adjacent segments of the other ring.

3. A packing ring comprising two rings of equal diameter and width interengaged by means of axially disposed annular flanges and recesses, the said recesses being wider than the flanges, each ring being divided into two equal segments, the joints of one ring being spaced apart from the joints of the other ring and the ends of one segment inwardly pressing the adjacent segments of the other ring.

In witness whereof, I hereunto subscribe my name this 24th day of January, 1929.

TAGE MADSEN.